Nov. 17, 1942. J. Q. A. HOLLOWAY 2,302,372
CHANGEABLE EXHIBITOR
Filed Oct. 25, 1938 3 Sheets-Sheet 1
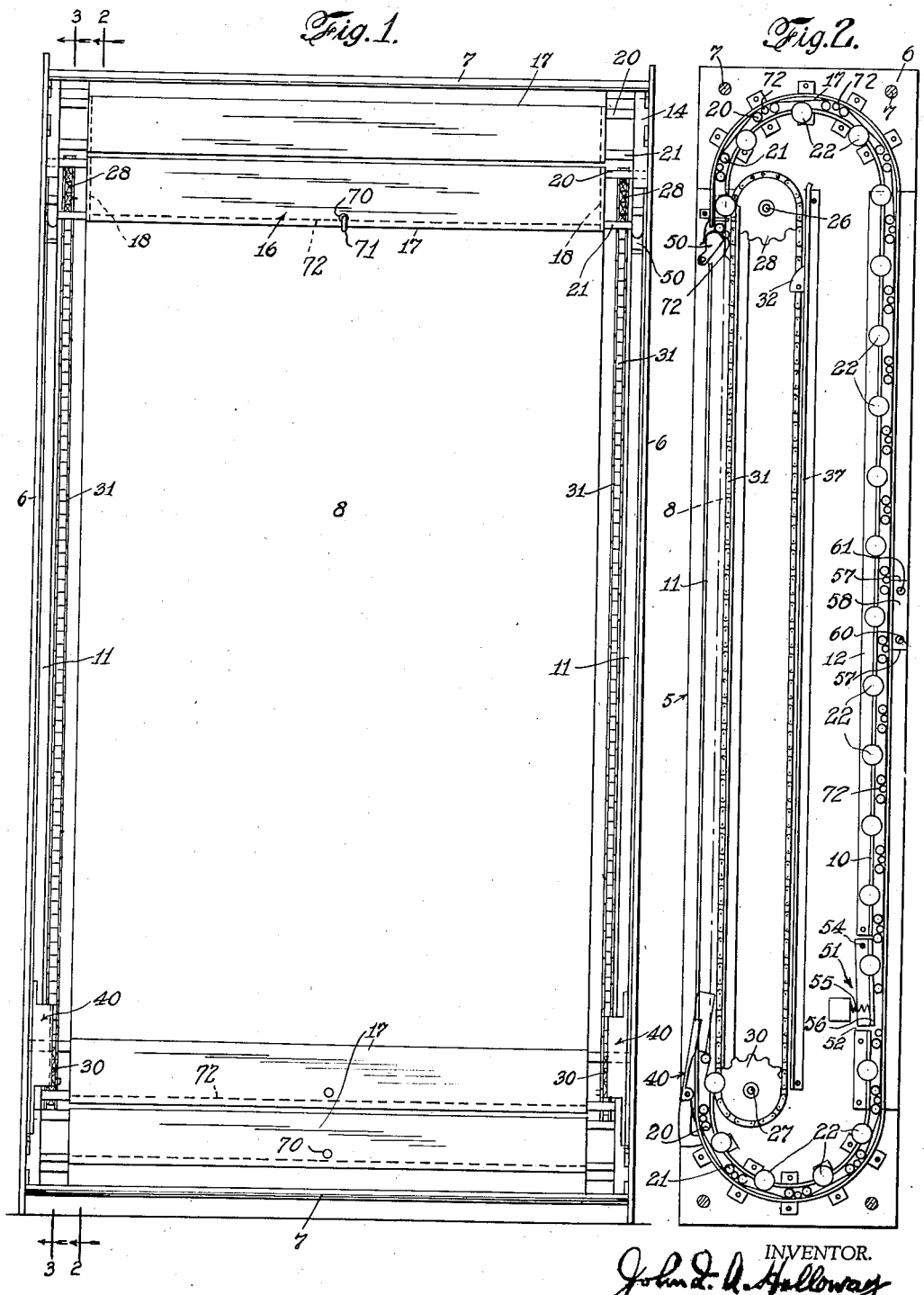
INVENTOR.
John Q. A. Holloway Nov. 17, 1942.  J. Q. A. HOLLOWAY  2,302,372
CHANGEABLE EXHIBITOR
Filed Oct. 25, 1938  3 Sheets-Sheet 2
Fig. 3.
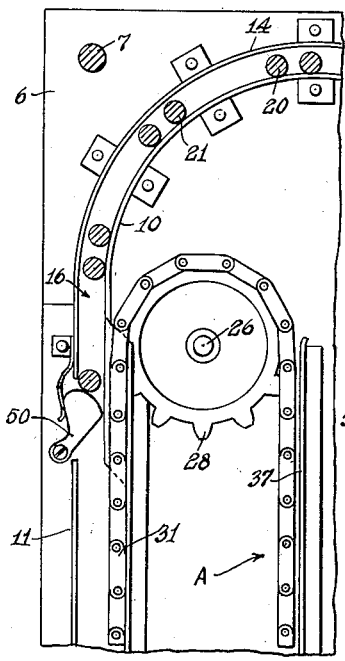
Fig. 4.
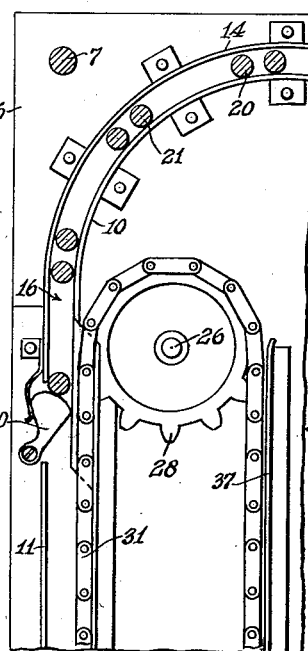
Fig. 5.
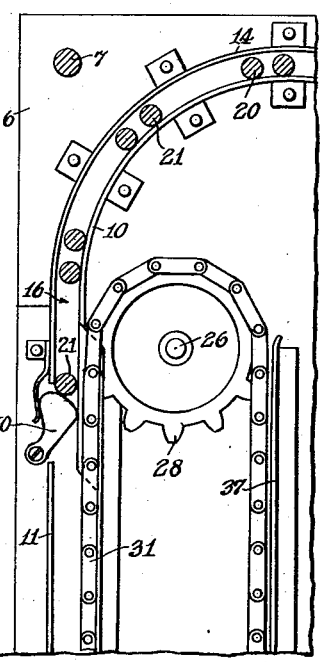
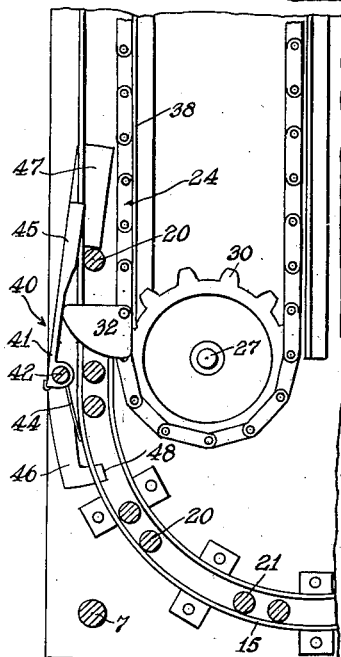
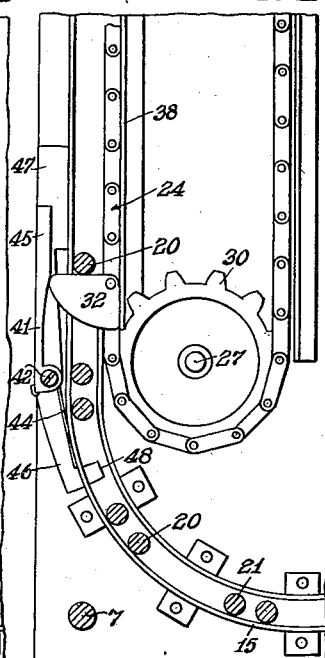
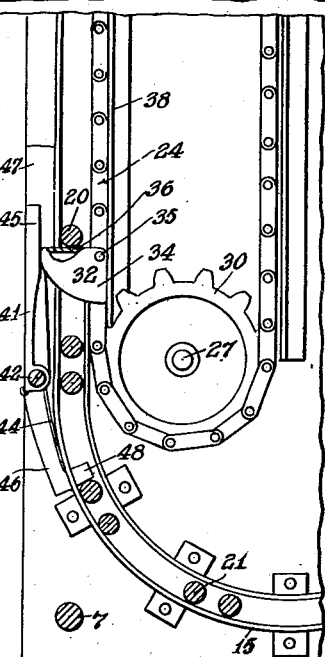
INVENTOR.
John Q. A. Holloway

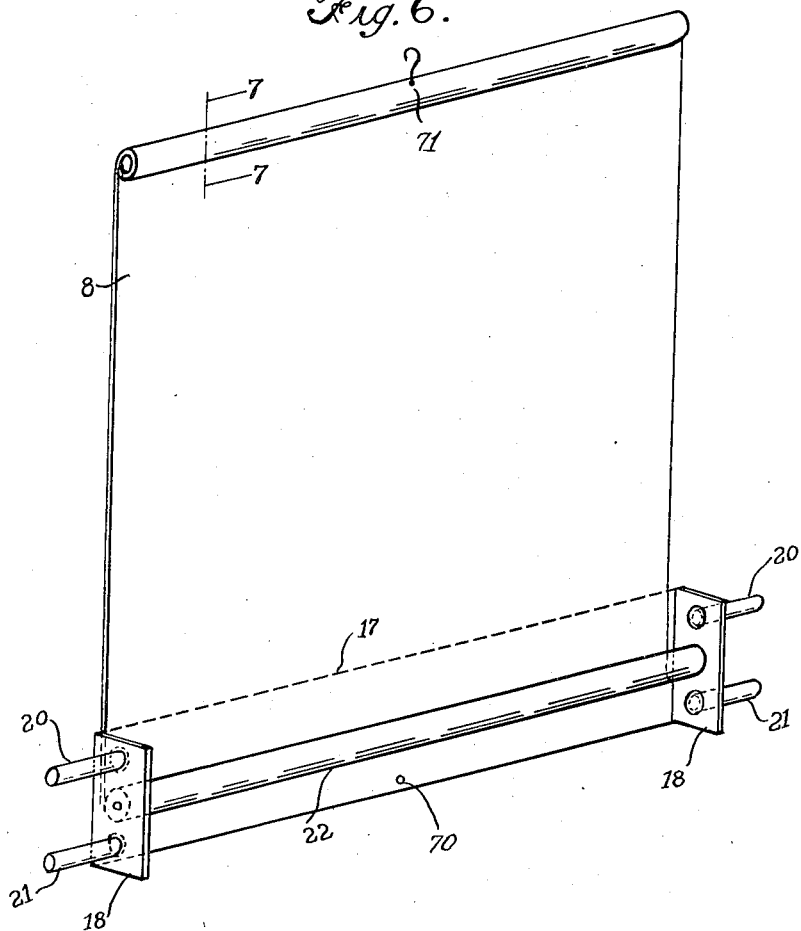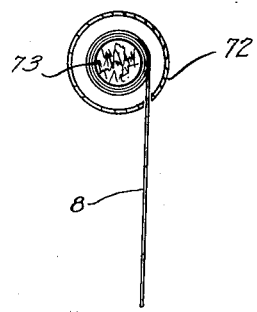

Patented Nov. 17, 1942

2,302,372

UNITED STATES PATENT OFFICE 2,302,372

CHANGEABLE EXHIBITOR

John Q. A. Holloway, New York, N. Y.

Application October 25, 1938, Serial No. 236,838

12 Claims. (Cl. 40—36)

This invention relates to changeable exhibitors, and has particular reference to that class of exhibitors which are employed to successively move a plurality of display elements, such as posters and the like, into and out of display position.

Important objects of the present invention are to provide an improved changeable exhibitor of the type mentioned which is simple, inexpensive, reliable and otherwise highly satisfactory from a structural standpoint as well as from a functional standpoint.

Other objects and advantages of the invention will become apparent from the following description when taken in connection with the accompanying drawings, in which—

Fig. 1 is a front view of an exhibitor embodying the present invention;

Fig. 2 is a vertical, sectional view taken on line 2—2 of Fig. 1;

Fig. 3 is an enlarged, fragmental, sectional view taken on line 3—3 of Fig. 1 and illustrating the positions that various elements of the device assume incident to the initiation of a poster-change;

Fig. 4 is a view similar to that of Fig. 3 and illustrating a position that various elements of the device assume pursuant to the initiation of a poster-change;

Fig. 5 is a view similar to that of Fig. 4 and illustrating the positions that the various elements of the device assume further pursuant to the initiation of a poster-change;

Fig. 6 is a perspective view of one of the carrier units with a display roller mounted in place; and Fig. 7 is a sectional view disclosing the method of terminating one end of the display posters.

The exhibitor embodying the present invention is herein illustrated as including a frame 5 having side walls 6, from one to the other of which extend a plurality of tie rods 7. The frame 5 may be positioned within a suitable cabinet, not shown, provided at its front with a suitable window-like panel, behind which the mechanism forming a part of the present invention is located and through which a plurality of display elements, such as posters or the like, may be observed one after another as they are moved successively into display position, one of such posters being most clearly shown in Fig. 1 and there indicated by the numeral 8.

Disposed within the frame 5 are a pair of endless track-like guides 10 which are connected respectively to the side walls 6, each guide including front and rear straight-away portions or reaches 11—12 and upper and lower curved sections 14—15. The track-like guides 10 are adapted to hold, support and guide a plurality of display-carrier units 16, each of which includes a frame member 17 provided at its ends with a pair of rearwardly projecting lug-like wings 18. Each of the carrier units 16 further includes a pair of rods 20 and 21, which are disposed in a parallel relation and are suitably connected to the wings 18, through which they project, as shown in Fig. 1, a sufficient distance to enter the track-like guides 10 where they, in conjunction with such guides, serve as means for maintaining the carrier units 16 in a definite path of travel during operation of the device. Further, each of the carrier units 16 includes a roller 22, of the conventional spring actuated window-shape type, which may be detachably connected, by any suitable means, to the lug-like wings 18, between which the roller is adapted to operate. Each of the rollers 22 carries one of the display elements 8, it being observed that the outer or free end of any given display element may be detachably connected, by suitable means, to the carrier unit 16 next in advance of the particular carrier unit of which such display element constitutes a part. Novel means of terminating the free end of each roller will be covered below. Taking into account the relationship thus existing between adjacent carrier units 16, it will become apparent that if any given carrier unit is advanced from No. 1 position while the adjacent carrier units are held against displacement, as under conditions exemplified in Figs. 3 to 5, the display element 8 peculiar to the advancing carrier unit will be rewound on its spring-actuated roller 22 while the display element which is individual to the roller 22 of the carrier unit immediately at the rear of the moving carrier unit will be unwound from such roller against the action of its associated spring. According to the present invention, the means employed for advancing any given carrier unit 16 from No. 1 position while maintaining adjacent carrier units stationary so as to effect a rewinding of the display element 8 which is peculiar to the carrier unit undergoing displacement and to simultaneously effect an unwinding of the display element which is peculiar to the carrier unit in No. 2 position, includes a carrier unit restraining, releasing and shifting mechanism which is indicated generally by the reference character A and details of which are shown most clearly in Figs. 3 to 5.

The above-mentioned carrier unit restraining, releasing and shifting mechanism A includes an endless conveyer 24, comprising a pair of shafts 26—27 which are suitably supported at their opposite ends adjacent the side walls 6 of the frame 5 and are adapted to be rotated in a clockwise direction, reference being had to Figs. 2 to 5, by suitable means such as an electric motor, not shown. The shafts 26—27 are provided respectively with a pair of sprockets 28—30, one sprocket of each of such pairs being shown in Fig. 1 and the other sprocket of each of such pairs being shown in Figs. 2 to 5. With the sprockets 28—28 and 30—30 are associated sprocket chains 31, the front and rear reaches of which are moved upwardly and downwardly respectively incident to rotation of the shafts 26 and 27 in a clockwise direction, as viewed in Figs. 2 to 5. In order that the chains 31 may function to successively elevate and release the carrier units 16, in a manner to be hereinafter more particularly described, each of such chains is provided with a carrier unit engaging lug 32. These lugs are correspondingly positioned on the respective chains 31 and are pivotally supported so that they may move, under certain conditions of operation, from their extended positions shown in Figs. 3 to 5 to their retracted positions shown in Fig. 2 and vice versa. Each of the carrier unit engaging lugs includes a pair of substantially triangularly shaped wing-like plates 34 which are pivotally connected to a chain link as indicated at 35, the plates 34 being disposed at opposite sides of such link and connected at their upper margins, reference being had to Figs. 3 to 5, by a platform-like web 36 on which ride opposite ends of the rods 20 of the respective carrier units 16 as such units are moved from their No. 1 positions to their display positions under the direct action of the endless conveyer 24. It will be appreciated, due to the character of the carrier unit engaging lugs 32 and their relation to the respective chains 31 to which they are pivotally connected, that as the lugs pass unobstructedly over the sprockets 28—30 carried by the shaft 26 they are free to swing under the action of gravity from their extended positions, reference being had to Figs. 3 to 5, to their retracted positions, as shown in Fig. 2, in which latter positions they are definitely maintained during downward travel by a pair of keeper strips 37, between which and the rear reaches of the chains the webs 36 are accommodated, the keeper strips being substantially coextensive with the rear reaches of the chains adjacent to which they are suitably supported in a parallel relation. As the carrier unit engaging lugs 32 move into positions free and clear of the lower ends of the keeper strips 37 and begin to move about the sprockets 28—30 of the shaft 27, they swing unobstructedly under the action of gravity to their extended positions, they being limited in such swinging movement by reason of the fact that their webs 36 assume abutting engagement with the chains 31. This abutting engagement is maintained until such time as the carrier unit engaging lugs 32 assume positions at or in the vicinity of the lowest peripheral point on the sprockets 28—30 of the shaft 27, but upon further translatory movement of the lugs they swing toward their retracted positions and are thus permitted to unobstructedly pass the rod 21 of the carrier unit 16 then in No. 1 position, as well as the rod 20 of the carrier unit then in No. 2 position. It will be observed that immediately after the carrier unit engaging lugs 32 move clear of the rod 21 of the carrier unit which is about to be lifted, as illustrated in Fig. 3, the carrier unit engaging lugs 32 are positively swung outwardly to their extended positions, such swinging movement of the lugs being accounted for by reason of the fact that they, at the proper instant in their upward translatory movement, engage and are thus subjected to a camming action by the lower ends of a pair of keeper strips 38 which are substantially coextensive with the front reaches of the chains 31 adjacent to which they are suitably supported in a parallel relation. The engagement which is thus established between the carrier unit engaging lugs 32 and the keeper strips 38 is maintained, with the result that the lugs are maintained in their extended positions, until such time as the lugs, incident to upward movement thereof along the keeper strips 38, pass free and clear of the upper ends of such strips, after which the lugs are permitted to swing under the action of gravity to their retracted positions.

During such time as any given carrier unit 16 is being moved upwardly along the front reaches of the chains 31, the carrier units occupying the lower curved sections 15 of the track-like guides 10 are positively restrained against displacement by a pair of escapement devices 40 which are adapted to be operated in synchrony under the action of the carrier unit engaging lugs 32. Each of the escapement devices 40 includes a rocker 41 which is pivotally supported as at 42 and with which is associated a spring 44 normally maintaining the rocker in its position shown in Figs. 2 and 3. The rocker 41 includes a pair of arms 45 and 46, the former of which is provided with a lug 47 normally positioned, with respect to the path of travel of the carrier units 16, to engage an outer end of the rod 20 of that carrier unit which, as shown in Figs. 2 to 5, is in No. 1 position and is about to be moved upwardly along the front reach of the chains 31. As the carrier unit engaging lugs 32 move upwardly, immediately pursuant to their having assumed extended positions upon engagement with the keeper strips 38, they engage the arms 45 and function to move the rockers 41 in a counter-clockwise direction, reference being had to Fig. 3, thus moving the lugs 47 out of the path of travel of the carrier units 16 so as to permit the carrier unit in No. 1 position to unobstructedly pass the lugs 47. Incident to movement of the lugs 47 out of the path of travel of the carrier units 16, the lug-like ends 48 of the arms 46 move into the path of travel of the carrier units along the lower curved sections 15 of the track-like guides 10 where they are adapted to engage the outer ends of the rod 20 of the carrier unit which is then in No. 3 position, the carrier unit which is then in No. 2 position having assumed that position under conditions hereinafter more particularly described. The instant the carrier unit 16 which is undergoing upward displacement moves free and clear of the lugs 47, the escapement devices 40 are moved under the action of their associated springs 44 in a clockwise direction to their positions shown in Figs. 2 and 3, thus causing the lugs 47 to assume restraining positions with relation to the next carrier unit and at the same time causing the lug-like ends 48 of the arms 46 to move out of the path of travel of the carrier units along the lower curved sections 15 of the track-like guides 10. As the carrier unit 16 which is undergoing upward displacement continues to move under the action of the carrier unit engaging lugs 32, the poster 8 is unrolled from the roller 22 of the next succeeding carrier unit below, whereas the last preceding poster on display is wound on the roller 22 of the carrier unit undergoing displacement. At or about such time as the carrier unit 16 which is undergoing displacement moves into display position, the outer ends of the rods 20 and 21 of such unit engage a pair of spring pressed retaining pawls 50 and move them forwardly out of the path of travel of the carrier, the pawls being adapted to assume restraining positions incident to the passage of the carrier so as to support it in display position after being freed from engagement with the carrier unit engaging lugs 32. Novel features of this pawl will be described below. Disengagement of the carrier unit engaging lugs 32 with the respective carrier units 16 is effected as such units move past the retaining pawls 50 by reason of the fact that at or about the instant these lugs begin to pass around the sprockets 28—30 they assume positions free and clear of the keeper strips 38, thus permitting them to swing inwardly about their pivot points from extended to restricted positions in which latter positions they are retained by gravity as they pass over the sprockets 28—30 preparatory to their downward movement along the rear reaches of the chains 31 during which time they are positively held in their retracted positions by the keeper strips 37.

It will be observed that the number of carrier units 16 constituting a full complement is such that they occupy all or substantially all of the available space represented by the rear straight-away portions or reaches 12 as well as the upper and lower curved sections 14—15 of the endless track-like guides 10, which means, of course, that as a given carrier unit is moved into display position under the direct action of the carrier unit engaging lugs 32, all of the remaining units are displaced or moved forwardly along the track-like guides 10 a distance corresponding to their respective transverse dimensions. As a result of such displacement of the carrier units 16, the next carrier unit to be elevated is forced into No. 1 position and the succeeding carrier unit is moved past the retracted lugs 48 into No. 2 position, which is the position of the carrier unit illustrated in Figs. 2 and 3 as located intermediate the lugs 47 and 48.

In order to relieve the carrier units (occupying the lower curved sections 15 of the track-like guides 10) of the weight represented by the carrier units disposed, at any instant, along the rear straight-away portions or reaches 12 of the track-like guides, and thus minimize the power required to operate the escapement devices 40, there are provided in association with the rear straight-away portions or reaches 12 a pair of brake-devices 51. These brake-devices 51 include escapement gates 52, which are pivotally supported as at 54 and in themselves constitute portions of the track-like guides 10, the gates being normally urged inwardly with respect to the guides by a pair of springs 55 so that they form (in the tracks 10), slightly restricted throats, as shown at 56, through which the outer ends of the rods 20—21 of the several carrier units 16 pass while being impinged by the gates 52, such impingement being sufficiently great in magnitude to adequately support the carrier units thereabove but yet of such magnitude as will permit the carrier units to escape one by one into the lower curved sections 15 of the guides as successive carrier units assume display positions.

Although various means may be employed to facilitate introduction of the carrier units 16 into the apparatus and to facilitate removal of such units, it has been found that such introduction and removal may be conveniently effected by way of a pair of gate openings 57 formed in the rear straight-away portions or reaches 12 of the track-like guides 10. These openings are of sufficient width to accommodate the carrier units 16 and are normally maintained closed by a pair of gates 58, which in themselves form portions of the track-like guides 10 and are pivotally supported, as at 60, so as to permit them to be moved to open and closed positions, respectively, in which latter positions they may be positively held by suitable means such as retaining screws 61.

As shown, pawl 50 has a curvilinear bearing surface upon which the carrier guides or guide rods rest. In the ordinary changeable exhibitor such guides travel past a pawl or catch having a straight surface. As a result, the guide must be raised somewhat beyond its final resting elevation and permitted to drop back into position upon release. This results in considerable noise. The pawl disclosed is surfaced in such manner that no matter how high the guide is raised within certain specified limits, some point of pawl 50 will be bearing upon it and holding it in place, thus eliminating any backlash and resultant noise.

As described above, each carrier unit includes a roller 22, of the conventional spring actuated window-shade type. Each roller carries a display element 8 which is fastened at one end to such roller and at the other end to the carrier unit 16 next in advance by means of hook 71 inserted into opening 70 in frame member 17. Such free end (connected to carrier next in advance) is novelly terminated by wrapping the display element 8 around a dowel 73 and inserting dowel 73 and wrapped element 8 into a slitted tube 72 of diameter slightly larger than the dowel.

While only one form of the invention is herein shown and described, it will be understood that various changes may be made without departing from the spirit of the invention or the scope of the following claims.

I claim:

1. A changeable exhibitor comprising guide means defining a path including front, rear, upper and lower path portions; a complement of carrier units associated with said guide means and adapted to traverse said path, said complement of units normally occupying said rear, upper and lower path portions; shifting mechanism operable to effect successive movement of carrier units from said lower path portion to display position and to effect step-by-step travel of carrier units along said upper, rear and lower path portions; and a brake-device arranged adjacent said path and operable to normally restrain carrier units under the action of gravity and adapted to yieldingly operate to release said restraining units successively as carrier units are moved successively into said display position.

2. A changeable exhibitor comprising guide means defining a path including front, rear, upper and lower path portions; a complement of carrier units associated with said guide means and adapted to traverse said path; shifting mechanism operable to effect successive movement of carrier units from said lower path portion to display position and to effect step-by-step travel of carrier units along said upper, rear and lower path portions, and escapement means normally restraining against displacement the carrier units occupying said lower path portion and operable incident to movement of said shifting mechanism into its carrier unit engaging position to release the uppermost unit with which such shifting mechanism is adapted to engage in effecting movement of that unit to display position, said escapement means consisting of a rocker pivotally supported substantially in its midportion and including upper and lower restraining lugs at the ends thereof.

3. A changeable exhibitor comprising guide means defining a path including front, rear, upper and lower path portions; a complement of carrier units associated with said guide means and adapted to traverse said path; shifting mechanism operable to effect successive movement of carrier units from said lower path portion to display position and to effect step-by-step travel of carrier units along said upper, rear and lower path portions, escapement means normally restraining against displacement the carrier units occupying said lower path portion and operable incident to movement of said shifting mechanism into its carrier unit engaging position to release the uppermost unit with which such shifting mechanism is adapted to engage in effecting movement of that unit to display position; and means rendered effective incident to the operation of said escapement means for retaining residual carrier units located in said lower path portion and at the rear of said uppermost unit against displacement until such time as said uppermost unit is released, said escapement means consisting of a rocker pivotally supported substantially in its midportion and including upper and lower restraining lugs at the ends thereof.

4. A changeable exhibitor comprising guide means defining a path including front, rear, upper and lower path portions; a complement of carrier units associated with said guide means and adapted to traverse said path, each said unit comprising a carrier, a guide member to guide said carrier in said path, a spring biased roller secured in said carrier and a poster connected with one end to said spring biased roller and, having at its free end a dowel around which said free end is wrapped and a slitted tube into which it is placed together with said dowel.

5. In a changeable exhibitor comprising guide means defining a path including front, rear, upper and lower path portions; a complement of carrier units associated with said guide means and adapted to traverse said path, and means for retaining any of such units in a predetermined position, said means consisting of a spring actuated pawl with an eccentric curvilinear bearing surface, and on which surface each point is tangential with said carrier unit at a different point thereon and at a different portion of the travel path thereof.

6. In a changeable exhibitor comprising guide means defining a path including front, rear, upper and lower path portions; a complement of carrier units associated with said guide means and adapted to traverse said path, and means for retaining any of such units in a predetermined position by gravity, said means consisting of a spring actuated pawl with an eccentric curvilinear bearing surface, and on which surface each point is tangential with said carrier unit at a different point thereon and at a different portion of the travel path thereof.

7. In a changeable exhibitor comprising guide means defining a path including front, rear, upper and lower path portions; a complement of carrier units associated with said guide means and adapted to traverse said path, and means for retaining any of such units in a predetermined position by gravity, said means consisting of a pawl with an eccentric curvilinear bearing surface, and on which surface each point is tangential with said carrier unit at a different point thereon and at a different portion of the travel path thereof.

8. In a changeable exhibitor comprising guide means defining a path including front, rear, upper and lower path portions; a complement of carrier units associated with said guide means and adapted to traverse said path, and means for retaining any of such units in a predetermined position, said means consisting of a pawl with an eccentric curvilinear bearing surface, and on which surface each point is tangential with said carrier unit at a different point thereon and at a different portion of the travel path thereof.

9. In a changeable exhibitor, a complement of carrier units and means for retaining any of such units in a predetermined position, said means consisting of a spring actuated pawl with an eccentric curvilinear bearing surface, and on which surface each point is tangential with said carrier unit at a different point thereon and at a different portion of the travel path thereof.

10. In a changeable exhibitor, a complement of carrier units and means for retaining any of such units in a predetermined position, said means consisting of a pawl with an eccentric curvilinear bearing surface, and on which surface each point is tangential with said carrier unit at a different point thereon and at a different portion of the travel path thereof.

11. A changeable exhibitor comprising guide means defining a path including front, rear, upper and lower path portions; a complement of carrier units associated with said guide means and adapted to traverse said path; shifting mechanism operable to effect successive movement of carrier units from said lower path portion to display position and to effect step-by-step travel of carrier units along said upper, rear and lower path portions, said shifting mechanism including an endless conveyor, a carrier unit engaging lug connected to said conveyor, and escapement means normally restraining against displacement the carrier units occupying said lower path portion and operable incident to movement of said shifting mechanism into its carrier unit engaging position to release the uppermost unit with which such shifting mechanism is adapted to engage in effecting movement of that unit to display position, said escapement means consisting of a rocker pivotally supported substantially in its midportion and including upper and lower restraining lugs at the ends thereof, said upper restraining lug operable to release said uppermost unit for movement to display position as said carrier engaging lug acts upon said upper restraining lug forcing it out of the carrier unit path.

12. A changeable exhibitor comprising guide means defining a path including front, rear, upper and lower path portions; a complement of carrier units associated with said guide means and adapted to traverse said path; shifting mechanism operable to effect successive movement of carrier units from said lower path portion to display position and to effect step-by-step travel of carrier units along said upper, rear and lower path portions, said shifting mechanism including an endless conveyor, a carrier unit engaging lug connected to said conveyor, and escapement means normally restraining against displacement the carrier units occupying said lower path portion and operable incident to movement of said shifting mechanism into its carrier unit engaging position to release the uppermost unit with which such shifting mechanism is adapted to engage in effecting movement of that unit to display position, said escapement means consisting of a rocker pivotally supported substantially in its midportion and including upper and lower restraining lugs at the ends thereof, said upper restraining lug operable to release said uppermost unit for movement to display position as said carrier engaging lug acts upon said upper restraining lug forcing it out of the carrier unit path, and said lower restraining lug being simultaneously operable to restrain the second uppermost unit until the upper restraining lug is restored to normal incident to the movement of the uppermost carrier unit into display position.

JOHN Q. A. HOLLOWAY.